United States Patent
Efrati et al.

(10) Patent No.: US 11,271,875 B2
(45) Date of Patent: Mar. 8, 2022

(54) SYSTEM AND METHOD FOR CONTEXTUALLY BASED FULFILLMENT OF COMMUNICATION REQUESTS VIA A TELEPHONY PLATFORM

(71) Applicant: Vonage Business Inc., Atlanta, GA (US)

(72) Inventors: Tzahi Efrati, Hoboken, NJ (US); Kevin John Alwell, Belford, NJ (US)

(73) Assignee: Vonage Business Inc., Atlanta, GA (US)

( * ) Notice: Subject to any disclaimer, the term of this patent is extended or adjusted under 35 U.S.C. 154(b) by 536 days.

(21) Appl. No.: 15/651,623

(22) Filed: Jul. 17, 2017

(65) Prior Publication Data

US 2019/0020605 A1    Jan. 17, 2019

(51) Int. Cl.
| | |
|---|---|
| H04L 12/58 | (2006.01) |
| H04L 51/02 | (2022.01) |
| G06Q 10/02 | (2012.01) |
| G06Q 30/00 | (2012.01) |
| H04M 3/42 | (2006.01) |
| H04M 3/493 | (2006.01) |
| G06F 40/30 | (2020.01) |

(52) U.S. Cl.
CPC .............. *H04L 51/02* (2013.01); *G06F 40/30* (2020.01); *G06Q 10/02* (2013.01); *G06Q 30/016* (2013.01); *H04M 3/42127* (2013.01); *H04M 3/493* (2013.01)

(58) Field of Classification Search
CPC .............................. G06F 17/2785; G06F 17/28
USPC ........................................................... 704/9
See application file for complete search history.

(56) References Cited

U.S. PATENT DOCUMENTS

| | | | |
|---|---|---|---|
| 6,192,338 B1 * | 2/2001 | Haszto | G10L 15/30 704/257 |
| 8,954,317 B1 * | 2/2015 | Fisher | G06F 17/2705 348/14.08 |
| 2013/0152092 A1 | 6/2013 | Yadgar | |

(Continued)

FOREIGN PATENT DOCUMENTS

WO    WO-2017044163 A1    3/2017

OTHER PUBLICATIONS

"Create AI Chatbot Without Coding"; Published Apr. 25, 2016; Downloaded from web site https://botsify.com on Sep. 29, 2017.

(Continued)

*Primary Examiner* — Shaun Roberts
(74) *Attorney, Agent, or Firm* — Moser Taboada; Joseph Pagnotta

(57) ABSTRACT

Methods and systems for contextually based fulfillment of communication requests are provided herein. In some embodiments, a method for contextually based fulfillment of a communication request via a telephony platform, comprises receiving via a telephony-based communication, at a fulfillment center, a user request for a service; determining a service provider capable of fulfilling the user request; translating the user request into one or more user intents; creating a contextual framework based on the user intent; requesting additional information regarding details of the user intent based on the contextual framework; and fulfilling the user request using the user intents when the contextual framework is complete.

18 Claims, 4 Drawing Sheets

(56) References Cited

U.S. PATENT DOCUMENTS

2014/0280757 A1 9/2014 Tran
2014/0379338 A1* 12/2014 Fry .................. G10L 15/19
704/246

OTHER PUBLICATIONS

"Build a Facebook Bot Without Coding"; Published Mar. 5, 2016; Downloaded from web site https://chatfuel.com on Sep. 29, 2017.
Nick, Loper, "GoButler Review—Go Butler SMS Assistant Reviews," Virtual Assistant. Downloaded from web site URL:https://www.virtualassistantassistant.com/gobutler, on Nov. 26, 2016.
Nick, Loper, "Magic Review—Does the Get Magic Text Message Assistant Really Work?," Virtual Assistant. Downloaded from web site URL:https://www.virtualassistantassistant.com/magic, on Apr. 6, 2017.
Extended European Search Report dated Nov. 26, 2018 for Application No. 18184020.8-1213.

* cited by examiner

SYSTEM AND METHOD FOR CONTEXTUALLY BASED FULFILLMENT OF COMMUNICATION REQUESTS VIA A TELEPHONY PLATFORM

BACKGROUND

Field

Embodiments of the present invention generally relate to chatbot services and more specifically, to systems and methods for contextually based fulfillment of communication requests via an extension or duplication of chatbot services via SMS.

Description of the Related Art

A chatbot is a computer program that simulates human conversation. Chat bots are often used in e-commerce for engaging with third parties to accomplish tasks such as providing customer service, information collection, product and service marketing and promotion among others. However, chat bots are typically limited to specific conversations carried over the Internet. User input in text form or voice converted to text, is used verbatim to determine an appropriate response from a list of possible inputs. For example, a chatbot may interact with a user in an effort to satisfy an informational request, such as "How can I help? Say "Internet" if you are having trouble with your Internet service. Say "Billing" if you have a question about your bill", and the like. Requests can also be typed into a chatbot window (or session) on a display as part of or the entire interaction. However, if the user input does not match what the chatbot has stored as allowable responses, the chatbot will not know how to respond and may reply with a message such as, "I'm sorry. I didn't understand that." and may repeat the choices for the user. Natural Language Processing (NLP) has improved the ability of the chatbot to successfully interact with a user, but only within the realm of Internet-based communications.

In other words, chatbot services are typically not designed to determine the intent of the user based on the input from the user from other sources, namely a telephony-based communication. For example, SMS communications have gained widespread adoption over the past ten years moving from rudimentary text between two parties to highly interactive, multi-user group communications. Today's SMS also has the ability to send richer messages (including photos, video, emojis, hyperlinks and the like). However, SMS platforms do not have the capability to interact with chatbots or similar types of automated information request services. Due to this limitation, chatbot services are not available to those who desire to obtain services/conduct information requests via SMS. As such, the chatbot is unable to develop a contextual framework (i.e., additional elements such as answers, questions, etc.) associated with the user's telephony-based input.

Thus, there is a need for improved contextually based fulfillment of communication requests via a telephony-based methodology and preferably incorporating SMS.

SUMMARY

Methods and systems for contextually based fulfillment of communication requests via a telephony platform are provided herein. In some embodiments, a method for contextually based fulfillment of communication requests via a telephony platform comprises receiving via a telephony-based communication, at a fulfillment center, a user request for a service via an SMS; determining a service provider capable of fulfilling the user request; translating the user request into one or more user intents; creating a contextual framework based on the user intent; requesting additional information regarding details of the user intent based on the contextual framework; adding one or more additional user intents to the contextual framework by translating the additional information into one or more additional user intents; and fulfilling the user request using the user intents when the contextual framework is complete.

In some embodiments, a fulfillment center for contextually based fulfillment of communication requests may include at least one processor; at least one input device; and at least one storage device storing processor-executable instructions which, when executed by the at least one processor, perform the method for contextually based fulfillment of communication requests via a telephony platform.

In some embodiments, a non-transitory computer readable medium for contextually based fulfillment of communication requests via a telephony platform is disclosed. The computer readable medium stores computer instructions that, when executed by at least one processor causes the at least one processor to perform the method for contextually based fulfillment of communication requests via a telephony platform.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
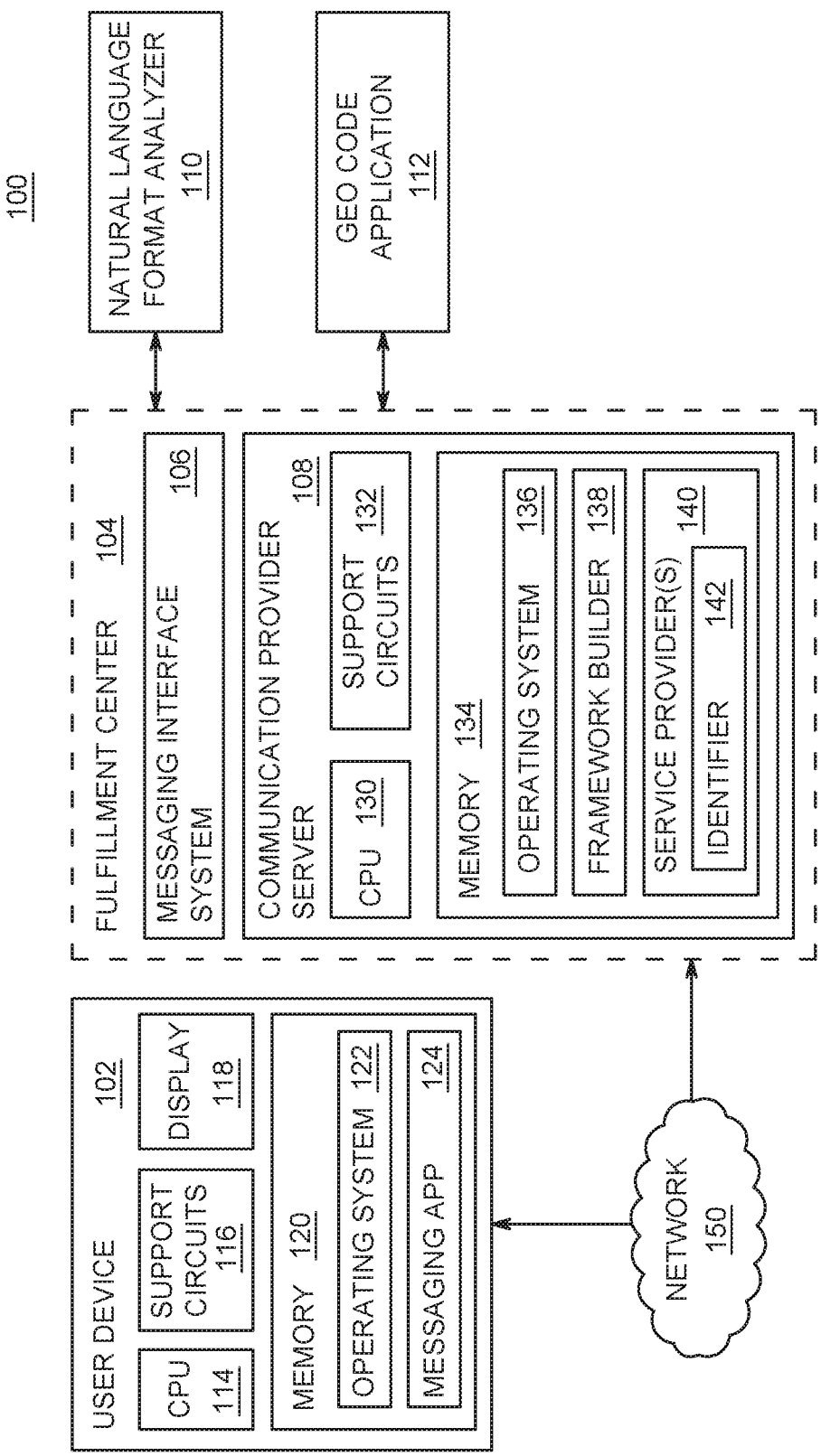
FIG. 1 depicts a block diagram of a system for contextually based fulfillment of communication requests, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to systems and methods for contextually based fulfillment of communication requests. More specifically, embodiments of the present invention receive a user request in the form of a message. The message may be a Short Message Service (SMS) message received at a fulfillment center. The SMS message is directed to a dedicated identifier (e.g., a telephone number). The fulfillment center includes a messaging interface system and a communication server adapted to build a contextual framework and facilitate fulfillment of the user request. Based on the dedicated identifier, a third party service provider capable of fulfilling the request is identified.

The user request is translated into user intent in order to build the contextual framework. The user request is in plain language; however the true intent of the user request must be determined from the plain language. The intent is determined by sending an application programming interface (API) request to a natural language analyzer that translates the plain language into user intent. For example the SMS text may read, "I need a couch delivered to my apartment." The fulfillment center may request additional information from the user regarding the details of the user request based on the contextual framework. For example, the information required to complete the contextual framework may include a location identifying where the couch needs to be picked up and a location identifying to where the couch needs to be delivered. The additional information is then translated into further user intent and added to the contextual framework. When the full user intent is determined (i.e., the contextual framework is complete), a request is sent to the third party service provider to fulfill the request. In the present example, a delivery service may be requested to pick up and deliver the couch as specified by the user intent.

Advantageously, third party service providers can request a dedicated inbound identifier. A third party service provider may then use the dedicated inbound identifier to promote their service via advertising in order to generate new user requests via SMS to the dedicated inbound identifier.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the following description, "plain language" and "natural language" are used interchangeably.

FIG. 1 depicts a block diagram of a system 100 for contextually based fulfillment of communication requests, according to one or more embodiments of the invention. The system 100 includes a user device 102, a fulfillment center 104, a natural language format analyzer 110, and a geocode application 112. The natural language format analyzer 110 may be a third-party application, such as GOOGLE® Cloud Natural Language application programming interface (API), IBM WATSON®, and the like, capable of extracting information from the natural language of a message and translating the information into user intent. The geocode application 112 may be a third-party application, such as GOOGLE Maps™ Geocoding API, capable of converting addresses into geographic coordinates and performing the process of reverse geocoding geographic coordinates into a human-readable address.

In some embodiments, the user device 102 may be a mobile computing device. User device 102 may comprise a Central Processing Unit (CPU) 114, support circuits 116, a display 118, and a memory 120 that includes an operating system 122, and a messaging application 124. The CPU 114 may comprise one or more commercially available microprocessors or microcontrollers that facilitate data processing and storage. The various support circuits 116 facilitate the operation of the CPU 114 and include one or more clock circuits, power supplies, cache, input/output device and circuits, and the like. The memory 120 comprises at least one of Read Only Memory (ROM), Random Access Memory (RAM), disk drive storage, optical storage, removable storage and/or the like.

The operating system (OS) 122 generally manages various computer resources (e.g., network resources, file processors, and/or the like). The OS 122 is configured to execute operations on one or more hardware and/or software modules, such as Network Interface Cards (NICs), hard disks, virtualization layers, firewalls and/or the like. Examples of the OS 122 may include, but are not limited to, various versions of LINUX, MAC OSX, BSD, UNIX, MICROSOFT WINDOWS, 10S, ANDROID and the like. In some embodiments, the messaging application 124 is a standard SMS application that is part of the original equipment manufacturer (i.e., mobile device manufacturer) software or its hardware equivalent. Alternately, the messaging application can be a VoIP app that provides over-the-top (OTT) VoIP telephony services to an end-user via the mobile device. In some embodiments, the messaging app 124 is a third-party app, such as SKYPE®, FACEBOOK® Messenger, and the like capable of sending an SMS text message to the fulfillment center 104.

In some embodiments, the fulfillment center 104 may be managed by a communication provider, such as a VoIP service provider, that maintains messaging interface system 106 and communication provider server 108. In some embodiments, messaging interface system 106 may be a separate entity that provides services to the communication provider server 108. An exemplary messaging interface system 106 may be NEXMO®, A VONAGE® API Platform.

Figure 4:
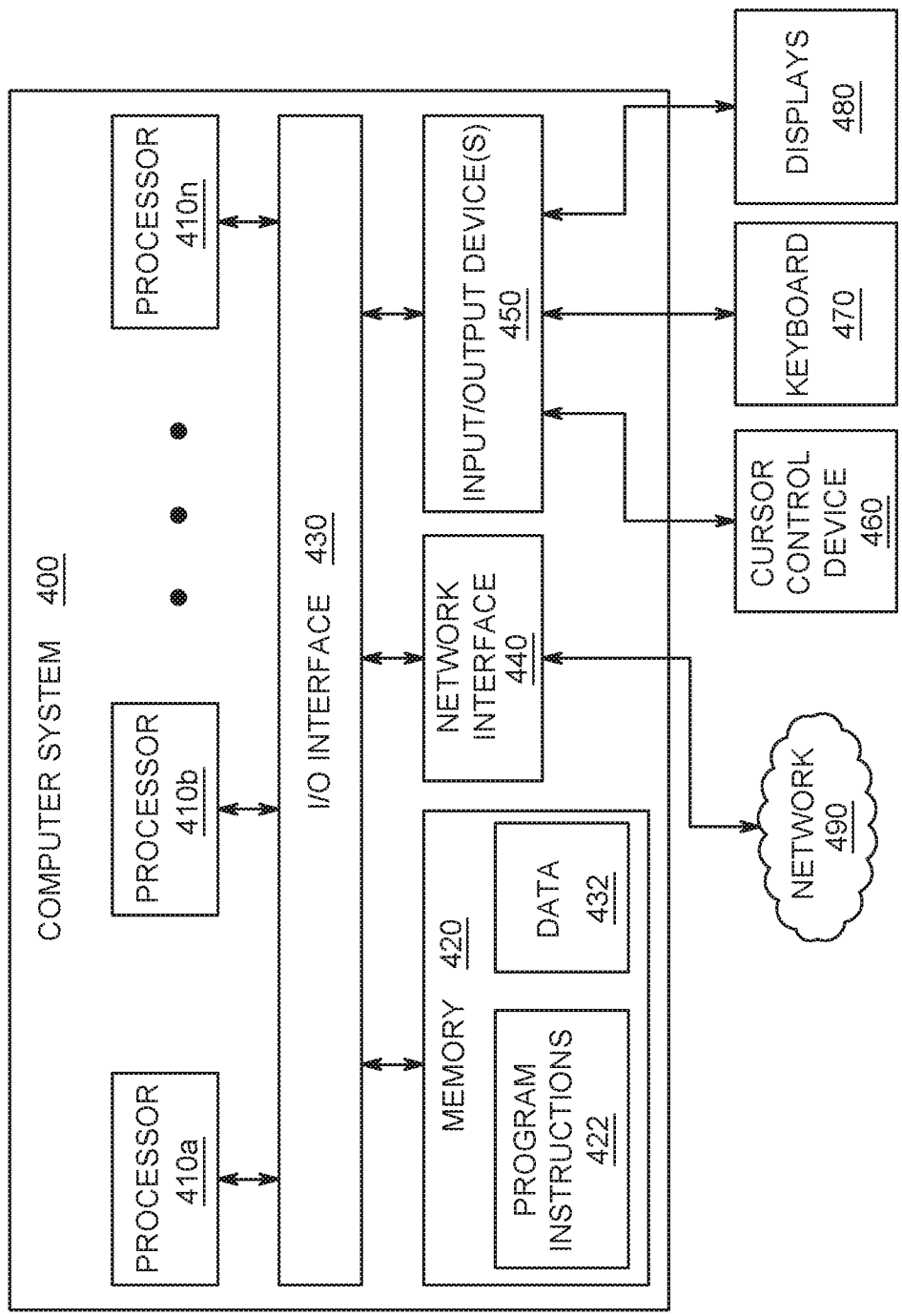
FIG. 4 depicts a computer system that can be utilized in various embodiments of the present invention.

The communication provider server 108 may be a computing device, for example, a desktop computer, laptop, tablet computer, and the like, or may be cloud based server e.g., a blade server, virtual machine, and the like. One example of a suitable computer is shown in FIG. 4, which will be described in detail below. The communication provider server 108 may include a Central Processing Unit (CPU) 130, support circuits 132, and memory 134. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 comprises at least one of Read Only Memory (ROM), Random Access Memory (RAM), disk drive storage, optical storage, removable storage and/or the like. In some embodiments, the memory 134 comprises an operating system 136, a framework builder 138, and a database of service providers 140, where each service provider is associated with an identifier 142. The operating system 136 generally manages various computer resources (e.g., network resources, file processors, and/or the like). The operating system 136 is configured to execute operations on one or more hardware and/or software modules, such as Network Interface Cards (NICs), hard disks, virtualization layers, firewalls and/or the like. Examples of the operating system 136 may include, but are not limited to, various versions of LINUX, MAC OSX, BSD, UNIX, MICROSOFT WINDOWS, 10S, ANDROID and the like.

The network 150 comprise one or more communication systems that connect computers by wire, cable, fiber optic and/or wireless link facilitated by various types of well-known network elements, such as hubs, switches, routers, and the like. The network 150 may include an Internet Protocol (IP) network, a public switched telephone network (PSTN), or other mobile communication networks, and may employ various well-known protocols to communicate information amongst the network resources.

The messaging interface system 106 receives a user request in the form of an SMS message from a user device 102. The SMS message is sent from the user device 102 in plain language format to a dedicated inbound identifier. The framework builder 138 performs a lookup of the dedicated inbound identifier to determine a third party service provider 140 that is associated with the dedicated inbound identifier and capable of fulfilling the user request. The framework builder 138 then translates the user request into one or more user intents. Due to the fact that the request is in plain language format, the true nature of the request (i.e. intent of the user) must be determined by translating the plain language into user intent. The framework builder 138 sends an API request to the natural language format analyzer 110 and in response receives the user intent.

Based on the user intent, the framework builder 138 communicates with the messaging interface system 106 to request more information from the user by sending an SMS message to the user device 102. For example, if the user request is for a ride from a car service, the framework builder 138 requests that the messaging interface system 106 request additional information, such as "where would you like to be picked up?". The information received from the user device 102 is passed from the messaging interface system 106 to the framework builder 138. If the information received is a type of location, for example, "the corner of 59$^{th}$ and Lex", the framework builder 138 may convert that information to a more specific address, such as "1000 3$^{rd}$ Ave, NY" and send an API request to a geocode app 112 which converts the address provided by the framework builder 138 into a complete address, such as "1000 3$^{rd}$ Avenue, New York, N.Y. 10022", which in turn may be sent to the messaging interface system 106 and forwarded to the user device 102 for confirmation by the user.

The conversation continues between the fulfillment center 104 and the user device 102 until all information is received to complete the contextual framework and fulfill the user request. In the present example, the user may be requested to provide a destination location and the above steps may be repeated to verify said location for the destination location. When all information is received by the framework builder 138 to fulfill the request, the framework builder 138 sends a request to the third-party service provider capable of fulfilling the request. In some embodiments, the request may be an API call. The request is sent using information stored in the fulfillment center 104 for service providers 140. If the response from the service provider is an acknowledgment that the request can be fulfilled, the messaging interface system 106 may send a confirmation message to the user device 102. In the present example, the message may be, "A car will pick you up shortly."

As such, regardless of what natural language is included in the SMS message of the user request, the fulfillment center can build a contextual framework that includes all of the information needed to fulfill the user request.

Figure 2:
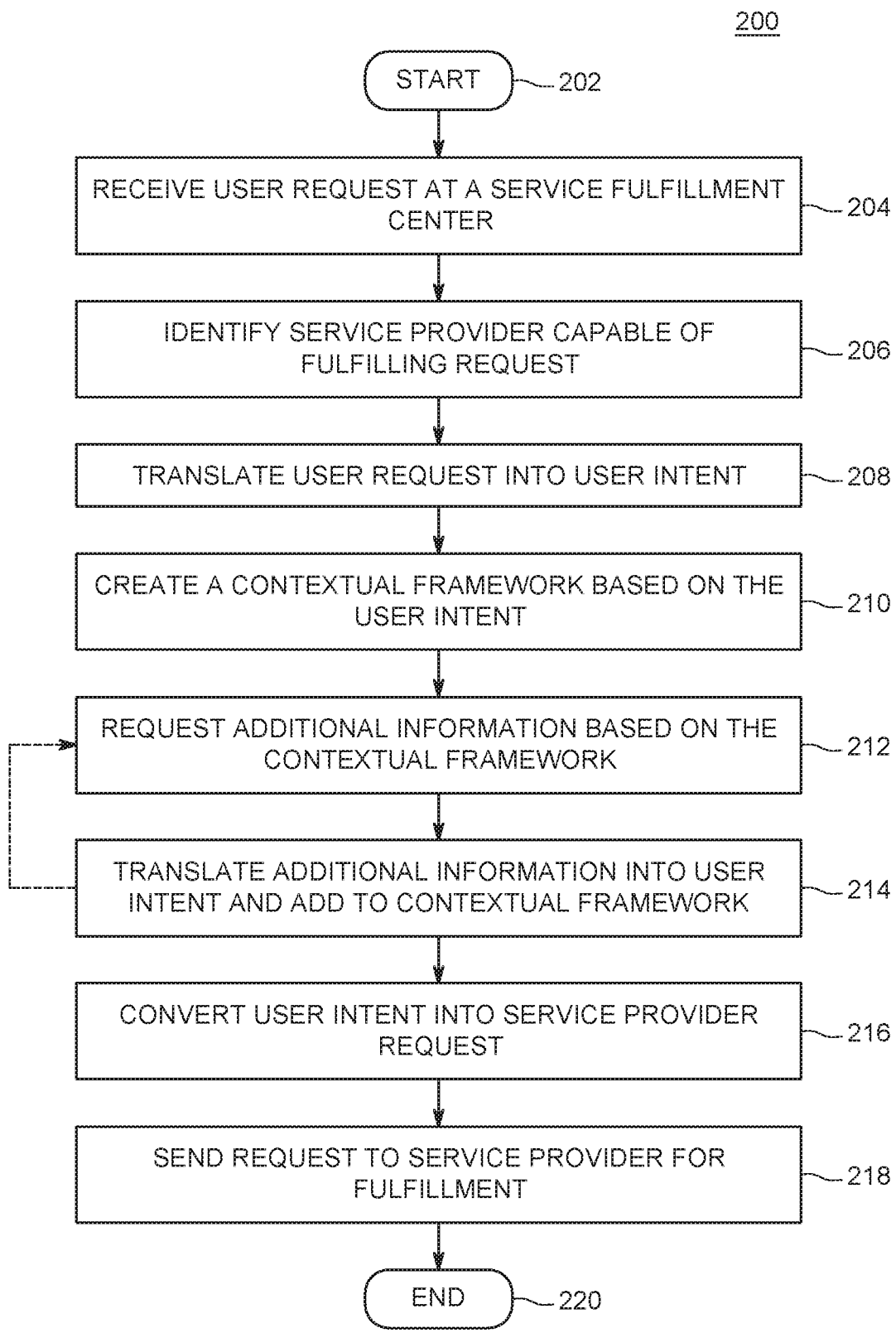
FIG. 2 depicts a flow diagram a method for contextually based fulfillment of communication requests, in accordance with one or more embodiments of the invention.

FIG. 2 depicts a flow diagram a method 200 for contextually based fulfillment of communication requests, in accordance with one or more embodiments of the invention. The method 200 starts at step 202 and proceeds to step 204.

At step 204, a user request is received at a fulfillment center. The fulfillment center includes a messaging interface system and a communication provider server in communication with the messaging interface system, where the communication provider server is adapted to interface with a natural language format analyzer. The request may be received from a user device in the form of an SMS message in plain language format. The request includes a dedicated inbound identifier (ID). From the user request, a contextual framework will be built to fulfill the user request based on user intent.

At step 206, the dedicated inbound ID is extracted from the user request. A lookup is performed to identify a third party service provider associated with the dedicated inbound ID and capable of fulfilling the user request. A mapping of dedicated inbound IDs to third party service providers is stored in the fulfillment center.

At step 208, the user request is translated into user intent. The user intent from the initial user request is the first building block of the contextual framework. The plain language of the user request is translated into one or more intents. A session identifier is assigned to the request and the text of the user request may be sent as an API request to the natural language format analyzer. The natural language format analyzer responses with a user intent as well as a one or more follow up questions needed to complete the context framework based on the user intent.

At step 210, a contextual framework is created based on the user intent. The user intent returned from the natural language format analyzer is stored in the contextual framework.

At step 212, based on the contextual framework, one or more questions that may have been received from the natural language format analyzer are sent to the user device to request information needed to complete the contextual framework. For example, a user request of "I need a ride" may be translated into "Intent: Book a car service". The additional information needed may include a pick up location and a destination location. As such, a message may be sent to the user device requesting where the user would like to be picked up and where the user would like to be dropped off. A message may be sent to the user device requesting a time when the user would like to be picked up. The requested information is based on the user intent and used to build the contextual framework.

At step 214, the received information is translated using the natural language analyzer and added to the contextual framework. Steps 212 and 214 may optionally be repeated as needed until the contextual framework is complete and the full user intent is known.

At step 216, the user intent is converted into a request. The request may be in a format dictated by a third party service provider API.

At step 218, the request is sent to the third party service provider. The response from the third party service provider is received and a message is sent to the user device. In the present example, the message to the user device may be, "A car will be there shortly."

The method 200 ends at step 220.

Figure 3:
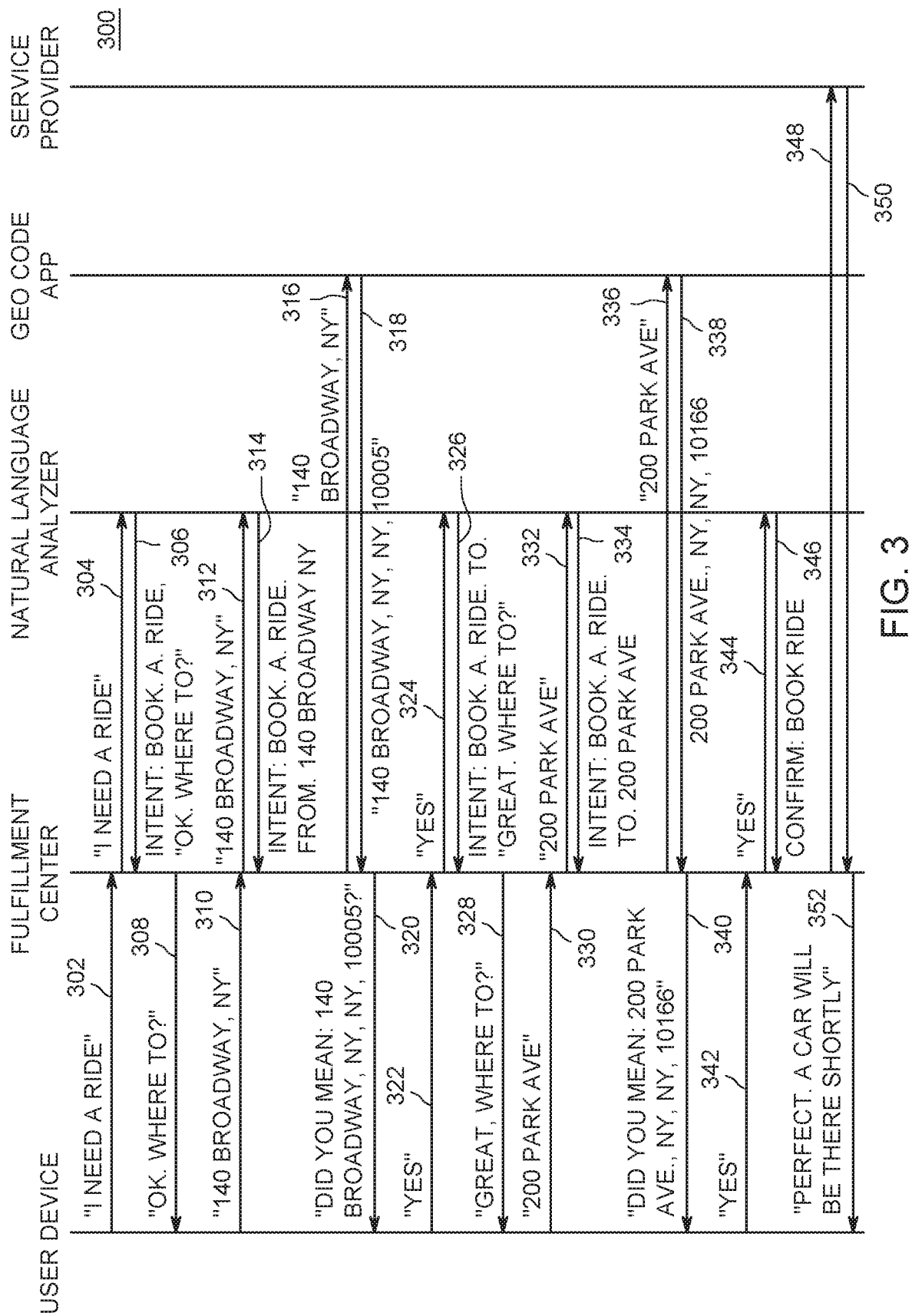
FIG. 3 depicts an exemplary flow diagram for requesting a car service using the fulfillment center, in accordance with one or more embodiments of the invention.

FIG. 3 depicts an exemplary flow diagram 300 for requesting a car service using the fulfillment center, in accordance with one or more embodiments of the invention.

At step 302, a user sends an SMS message to the fulfillment center, where the fulfillment center includes a message processing system and a communication server that includes a framework builder. The SMS message may read, "I need a ride." The request is received at a message processing system and sent to the framework builder via a webhook. As such, a Hyper Text Transfer Protocol (HTTP) POST is send to the framework builder within the fulfillment center. All messages received by the messaging interface system are sent to the framework builder in a similar manner.

At step 304, the fulfillment center determines the intent of the user by sending the natural language text of the message to the natural language analyzer. The fulfillment center also assigns a session identifier to the user request. In the present example, the message "Session ID: 400, I need a ride" is sent to the natural language analyzer and at step 306 a response is received that includes the session ID, the user intent, and a next question to send to the user device in order for the user to provide the complete intent for fulfilling the user request. In the present example, the response is: "Session ID: 400, INTENT: Book a ride", "Okay. Where to?"

At step 308, the framework builder sends a message, for example, an API call to the messaging interface system, which then forwards the message, "Okay. Where to?" to the user device via SMS message. At step 310, the user responds with an SMS message "140 Broadway, NY", which at step 312, the fulfillment center sends via an API call to the natural language analyzer. At step 314, the natural language analyzer returns the additional information describing the user intent to the fulfillment center. The message may be, "Session ID: 400, "Book a Ride From: 140 Broadway, NY". The fulfillment center adds this information to the contextual framework.

However, the address is not a complete address. As such, at step 316, the fulfillment center sends an API request to the geocoding application to provide a complete address for "140 Broadway, NY", which at step 318 returns the full address, "140 Broadway, New York, N.Y. 10005".

At step 320, the fulfillment center sends an SMS message to the user device to confirm the pickup location intent (e.g., address). For example, the SMS message may read," Did you mean: "140 Broadway, New York, N.Y. 10005?" At step 322, the user confirms the address by sending an SMS message that reads, "Yes." to the fulfillment center. At step 324, the message is sent to the natural language analyzer, which responds to the fulfillment center at step 326 with a request for additional information. In the present example, the response may be: "Session ID: 400, Intent: Book.A.Ride.To., "Great, where would you like to go?"

At step 328, the message is forwarded via SMS to the user device and at step 330, the user sends an SMS message that reads, "200 Park Ave." At step 332, the message is sent with the Session ID to the natural language analyzer, which at step 334, returns the user intent to the fulfillment center. The message may read, "Session ID: 400, Intent: Book.A.Ride.To. "200 Park Ave."

At step 336, the fulfillment center adds the information to the contextual framework and sends an API request to the geocoding application for a complete address for "200 Park Ave." At step 338, the complete address is returned to the fulfillment center, for example, "200 Park Ave., New York, N.Y. 10166".

At step 340, the fulfillment center sends an SMS message to the user device to confirm the destination intent, for example "Did you mean 200 Park Ave., New York, N.Y. 10166?" At step 342, the user response with an SMS message reading, "Yes.", to the fulfillment center, which adds the information identifying the user intent to the contextual framework. At step 344 the message is sent via API request to the natural language analyzer.

At step 346, the natural language analyzer confirms that all information to understand the user intent that is needed fulfill the contextual framework has been received and sends back the message, "Session ID: 400, Intent: Confirm.Book.Ride, yes." to the fulfillment center.

At step 348, the fulfillment center, upon receiving the message that the user intent is confirmed, sends the complete user intent to a third-party service provider capable of fulfilling the request. For example, the fulfillment center may make an API request to a car service, providing the pickup and destination locations. At step 350, the car service confirms that it can fulfill the request by responding to the fulfillment center's request.

At step 352, the fulfillment center sends an SMS message to the user device, for example, "Perfect, a car will be there to pick you up shortly."

FIG. 4 depicts a computer system 400 that can be utilized in various embodiments of the present invention to implement the computer and/or the display, according to one or more embodiments.

Various embodiments of method and apparatus for contextually based fulfillment of communication requests, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the flowchart2 200 and 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowcharts of FIG. 2 and FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for contextually based fulfillment of communication requests via a telephony platform, comprising:
  receiving via a telephony-based communication, at a fulfillment center, a user request for a service, wherein the user request is directed to a dedicated inbound identifier of a telephony system, and wherein the dedicated inbound identifier is associated with the identity of the service provider capable of fulfilling the user request;
  determining, by the fulfillment center, a service provider capable of fulfilling the user request;
  translating the user request into one or more user intents;
  creating, by the fulfillment center, a contextual framework based on the user intent, wherein the contextual framework comprises a plurality of information, and wherein the plurality of information is based on the requested service;
  requesting additional information from the user regarding details of the user intent to complete the contextual framework; and
  fulfilling, by the fulfillment center, the user request using the user intents when the contextual framework is complete, wherein fulfilling the user request comprises:
    converting the user intent into a service provider request; and
    sending the request to the service provider for fulfillment.

2. The method of claim 1, further comprising adding one or more additional user intents to the contextual framework by translating the additional information into one or more additional user intents.

3. The method of claim 1, wherein the fulfillment center comprises a messaging interface system and a communication server in communication with the messaging interface system.

4. The method of claim 3, wherein the communication server is adapted to interface with a natural language analyzer.

5. The method of claim 1, wherein the user request in a natural language format.

6. The method of claim 1, wherein the user request in an SMS message.

7. The method of claim 1, wherein translating the user request comprises an application programming interface (API) to a natural language analyzer.

8. The method of claim 1, wherein fulfilling the user request comprises:
  formatting the user intent;
  sending an API request to the service provider; and
  receiving an acknowledgement from the service provider that the request can be fulfilled.

9. The method of claim 8, further comprising sending a text confirming fulfilment of the user request from a device where the user request was received.

10. The method of claim 1, wherein the user request is a location based request.

11. A fulfillment center for contextually based fulfillment of communication requests via a telephony platform, comprising:
  a) at least one processor;
  b) at least one input device; and
  c) at least one storage device storing processor executable instructions which, when executed by the at least one processor, perform a method to:
    receiving via a telephony-based communication, at a fulfillment center, a user request for a service, wherein the user request is directed to a dedicated inbound identifier of a telephony system, and wherein the dedicated inbound identifier is associated with the identity of the service provider capable of fulfilling the user request;
    determining, by the fulfillment center, a service provider capable of fulfilling the user request;
    translating the user request into one or more user intents;
    creating, by the fulfillment center, a contextual framework based on the user intent, wherein the contextual framework comprises a plurality of information, and wherein the plurality of information is based on the requested service;
    requesting additional information from the user regarding details of the user intent to complete the contextual framework; and
    fulfilling, by the fulfillment center, the user request using the user intents when the contextual framework is complete, wherein fulfilling the user request comprises:

converting the user intent into a service provider request; and sending the request to the service provider for fulfillment.

12. The fulfillment center of claim 11, wherein the performed method further comprising adding one or more additional user intents to the contextual framework by translating the additional information into one or more additional user intents.

13. The fulfillment center of claim 11, wherein the fulfillment center comprises a messaging interface system and a communication server in communication with the messaging interface system, and wherein the communication server is adapted to interface with a natural language analyzer.

14. The fulfillment center of claim 11, wherein the user request in a natural language format.

15. The fulfillment center of claim 11, wherein the user request in an SMS message.

16. The fulfillment center of claim 11, wherein translating the user request comprises an application programming interface (API) to a natural language analyzer.

17. The fulfillment center of claim 11, wherein fulfilling the user request comprises:
  formatting the user intent;
  sending an API request to the service provider;
  receiving an acknowledgement from the service provider that the request can be fulfilled; and
  sending a text confirming fulfilment of the user request from a device where the user request was received.

18. A non-transitory computer readable medium for storing computer instructions that, when executed by at least one processor causes the at least one processor to perform a method for contextually based fulfillment of communication requests via a telephony platform, comprising:
  receiving via a telephony-based communication, at a fulfillment center, a user request for a service, wherein the user request is directed to a dedicated inbound identifier of a telephony system, and wherein the dedicated inbound identifier is associated with the identity of the service provider capable of fulfilling the user request;
  determining, by the fulfillment center, a service provider capable of fulfilling the user request;
  translating the user request into one or more user intents;
  creating, by the fulfillment center, a contextual framework based on the user intent, wherein the contextual framework comprises a plurality of information, and wherein the plurality of information is based on the requested service;
  requesting additional information from the user regarding details of the user intent to complete the contextual framework; and
  fulfilling, by the fulfillment center, the user request using the user intents when the contextual framework is complete, wherein fulfilling the user request comprises:
    converting the user intent into a service provider request; and
    sending the request to the service provider for fulfillment.

* * * * *